(12) United States Patent
Delaney

(10) Patent No.: US 9,456,120 B2
(45) Date of Patent: Sep. 27, 2016

(54) FOCUS HEIGHT REPEATABILITY IMPROVEMENT IN A MACHINE VISION INSPECTION SYSTEM

(71) Applicant: Mitutoyo Corporation, Kawasaki-shi, Kanagawa-ken (JP)

(72) Inventor: Mark Lawrence Delaney, Shoreline, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 446 days.

(21) Appl. No.: 13/940,224

(22) Filed: Jul. 11, 2013

(65) Prior Publication Data

US 2015/0015696 A1     Jan. 15, 2015

(51) Int. Cl.
*H04N 5/232*     (2006.01)

(52) U.S. Cl.
CPC .......... *H04N 5/23212* (2013.01); *H04N 5/232* (2013.01)

(58) Field of Classification Search
CPC .......................... H04N 5/23212; H04N 5/232
See application file for complete search history.

(56) References Cited

U.S. PATENT DOCUMENTS

| | | | |
|---|---|---|---|
| 5,790,710 A | 8/1998 | Price | |
| 6,542,180 B1 | 4/2003 | Wasserman | |
| 6,545,715 B1* | 4/2003 | Na | H04N 5/23212 348/252 |
| 7,030,351 B2 | 4/2006 | Wasserman | |
| 7,120,286 B2* | 10/2006 | Yu | G06K 9/6253 250/559.36 |
| 7,324,682 B2 | 1/2008 | Wasserman | |
| 7,454,053 B2 | 11/2008 | Bryll | |
| 8,111,905 B2 | 2/2012 | Campbell | |
| 8,111,938 B2 | 2/2012 | Bryll | |
| 2008/0130982 A1* | 6/2008 | Kitamura | G06K 9/00 382/144 |
| 2011/0133054 A1 | 6/2011 | Campbell | |

OTHER PUBLICATIONS

Geusebroek et al., "Robust Autofocusing in Microscopy," ISIS Technical Report Series, Vo. 17, Nov. 2000, pp. 1-18.*
Geusebroek, J.-M., and A.W.M. Smeulders, "Robust Autofocusing in Microscopy," ISIS Technical Report Series, vol. 17, Intelligent Sensory Information Systems Group, University of Amsterdam, Nov. 2000, 20 pages.
"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.
"QVPAK 3D CNC Vision Measuring Machine: User's Guide," Version 7.0, 1st ed., Manual No. 99MCB225A1, Series No. 359, Mitutoyo Corporation & Micro Encoder Inc., Kanagawa, Japan, Jan. 2003, 370 pages.

* cited by examiner

*Primary Examiner* — Thai Tran
*Assistant Examiner* — Christopher T Braniff
(74) *Attorney, Agent, or Firm* — Christensen O'Connor Johnson Kindness PLLC

(57) ABSTRACT

A method improves focus height repeatability in a machine vision inspection system. A region of interest is defined within a field of view imaged by a camera portion, wherein an aligned edge feature in the region of interest may introduce a focus height sensitivity that varies depending on the aligned edge feature offset relative to the image pixels. A first set of focus-determining operations determines a focus height for the region of interest, and comprise at least one of: (a) operations that reduce the sensitivity of the focus height determination to the offset of the aligned edge feature relative to the image pixels; and (b) operations that adjust the offset of the aligned edge feature relative to the image pixels according to a predetermined offset repeatability criteria, such that the image data used in the focus height determination fulfills the offset repeatability criteria.

20 Claims, 10 Drawing Sheets

FOCUS HEIGHT REPEATABILITY IMPROVEMENT IN A MACHINE VISION INSPECTION SYSTEM

BACKGROUND

Precision machine vision inspection systems (or "vision systems," for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system, which can be characterized as a general-purpose "off-line" precision vision system, is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in its entirety. This type of system is able to use a microscope-type optical system and move the stage so as to provide inspection images of either small or relatively large workpieces at various magnifications.

General purpose precision machine vision inspection systems, such as the QUICK VISION™ system, are also generally programmable to provide automated video inspection. Such systems typically include GUI features and predefined image analysis "video tools" such that operation and programming can be performed by "non-expert" operators. For example, U.S. Pat. No. 6,542,180 (hereinafter "the '180 patent"), which is incorporated herein by reference in its entirety, teaches such a vision system that uses automated video inspection. Video tools may be called simply "tools," for short. For example, edge-detection tools may include point tools for detecting a point on an edge, box tools for detecting the location and direction of an edge located in a region of interest defined by the box tool, and so on.

As taught in the '180 patent, automated video inspection metrology instruments generally have a programming capability that allows an automatic inspection event sequence to be defined by the user for each particular workpiece configuration. Such programming can be implemented as text-based programming, or through a recording mode that progressively "learns" the inspection event sequence by storing a sequence of machine control instructions and individual video tool parameters corresponding to a sequence of inspection operations defined and/or performed by a user (e.g., with the aid of various semi-automatic or automatic video tool operations), or through a combination of both methods. Such a recording mode is often referred to as "learn mode" or "training mode." In either technique, the machine control instructions and individual video tool parameters are generally stored as a part program that is specific to the particular workpiece configuration, and automatically perform a predetermined sequence of inspection operations during a "run mode" of operation.

Accuracies in the micron or sub-micron range are often desired in such systems. This is particularly challenging with regard to Z-height measurements. Z-height measurements (along the optical axis and focusing axis of the camera system) are generally derived from a "best focus" position, such as that determined by an autofocus tool or method. As described in greater detail below with reference to FIG. 4, according to known autofocus methods and/or tools, the camera moves through a range of Z positions along a Z axis (the focusing axis) and captures an image at each Z position. For each captured image, a focus metric is calculated based on the image and related to its Z position. This results in a focus curve data, which may be referred to simply as a "focus curve" or "autofocus curve." The peak of the focus curve corresponds to the best focus position along the Z axis and the Z height of the imaged surface.

One known method of autofocusing similar to that outlined above is discussed in "Robust Autofocusing in Microscopy," by Jan-Mark Geusebroek and Arnold Smeulders in ISIS Technical Report Series, Vol. 17, November 2000, which is hereby incorporated herein by reference in its entirety. The disclosed method teaches that the video hardware captures frames at a fixed rate, and that the sampling density of the focusing curve can be influenced by adjusting the stage velocity. Another known autofocus method and apparatus is described in U.S. Pat. No. 5,790,710, which is hereby incorporated by reference in its entirety. Other improved autofocus systems and methods are described in U.S. Pat. Nos. 7,030,351; 8,111,905; and 8,111,938; and U.S. Pre-Grant Publication No. 2011/0133054, each of which is commonly assigned and hereby incorporated by reference in its entirety.

The level of accuracy and repeatability achieved for Z-height measurements, based on autofocus tools or operations, is generally less than that achieved for other measurement axes in precision machine vision inspection systems, particularly for certain types of workpiece features and/or orientations that are not easily recognized as problematic by typical users. It would be desirable for an autofocus tool to operate automatically with improved accuracy, repeatability, and robustness, for a wider variety of workpiece surface features and/or orientations, in order to allow more accurate and/or repeatable and/or robust Z-height measurements to be determined.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
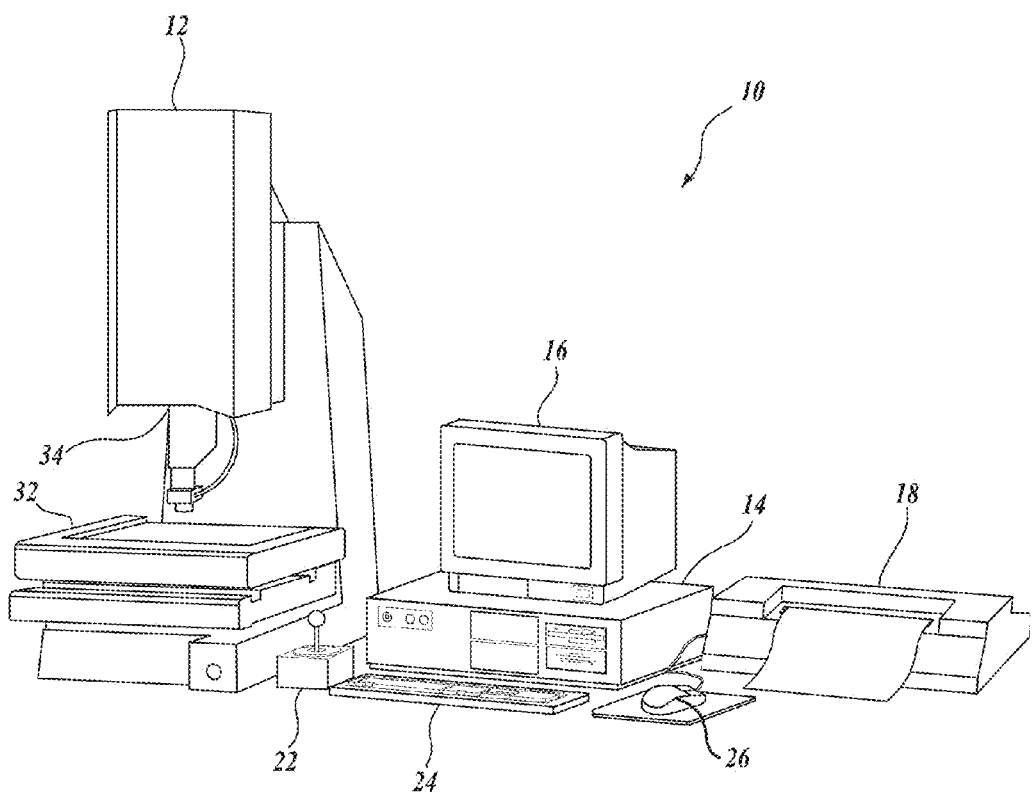
FIG. 1 is a diagram showing various typical components of a general purpose precision machine vision inspection system.

A method for improving focus height repeatability in a machine vision inspection system is provided. A camera portion is provided that is configured to provide an image of a field of view of a workpiece, wherein the image comprises image pixels. A region of interest is defined within the field of view imaged by the camera portion, the region of interest including an aligned edge feature of the workpiece, the aligned edge feature in the region of interest introducing a focus height sensitivity that varies depending on the offset of the aligned edge feature relative to the image pixels. A first set of focus-determining operations is provided that determines a focus height for the region of interest, the first set of focus-determining operations comprising operating the machine vision inspection system to provide a set of focus curve data for the region of interest based on a set of workpiece images acquired at a plurality of Z heights. The first set of focus-determining operations is further provided as also including edge offset desensitization operations comprising at least one of: (a) operations that reduce the sensitivity of the focus height determination to the offset of the aligned edge feature relative to the image pixels; and (b) operations that adjust the offset of the aligned edge feature relative to the image pixels according to a predetermined offset repeatability criteria, such that the image data that is used in the focus height determination fulfills the offset repeatability criteria.

In various implementations, the operations that reduce the sensitivity of the focus height determination to the offset of the aligned edge feature relative to the image pixels may comprise various types of techniques. For example, one technique that may be utilized includes using a combination of image data that includes different offsets in the image data used for the focus determination. Another technique includes low pass filtering of the image data so as to artificially increase the width of the edge profile relative to image pixels, such that the focus metric operations may in some instances remain unchanged. Conversely, other techniques may include adding a low pass filtering component to the focus metric operations, such that the image data may in some instances remain unchanged. Some such techniques may utilize intensity differences across more widely separated pixels, and/or averaging pixel intensities before taking differences, and/or including more differences over a wider kernel size, and/or averaging differences over sub-kernels before determining differences within the master kernel, etc.

In various implementations, the operations that adjust the offset of the aligned edge feature relative to the image pixels according to a predetermined offset repeatability criteria may also comprise various types of techniques. For example, techniques may be utilized that select the offset according to a desired focus metric criteria (e.g., selecting an offset that provides a focus metric of at least a specified amount, or at least a specified percentage of the maximum range, or within a determined range of metrics, etc.). Other techniques may evaluate an edge gradient along a scan line (or an average of scan lines) and determine how the gradient behaves versus the offset, such that the offset may be selected so as to establish the edge gradient at a desired level (e.g., at a specified percentage of its observed range, etc.).

In one example embodiment, the offset of the aligned edge feature may be adjusted by adjusting the location through a series of sub-pixel steps so as to determine a location which reduces focus errors. In one specific example implementation, the method may include initially performing a coarse scan in Z to determine an approximate focus level. At the approximate focus level, the system then microsteps in a first direction (e.g., along the X axis) in sub-pixel increments (e.g., by 0.1 or 0.2 pixels) until a full pixel has been swept. The contrast in the region of interest is computed for each step, and an alignment is selected in the first direction according to a first criteria (e.g., so as to maximize contrast). A similar process may then be performed in a second direction (e.g., along the Y axis) so as to determine and move to the optimum sub-pixel alignment in the second direction. Once the optimal sub-pixel alignment is achieved, the system completes the traditional fine autofocus scan so as to find the final Z autofocus position.

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, a keyboard 24, and the mouse 26.

Those skilled in the art will appreciate that the controlling computer system 14 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic- or optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053; 7,324,682; 8,111,905; and 8,111,938 each of which is incorporated herein by reference in its entirety.

Figure 2:
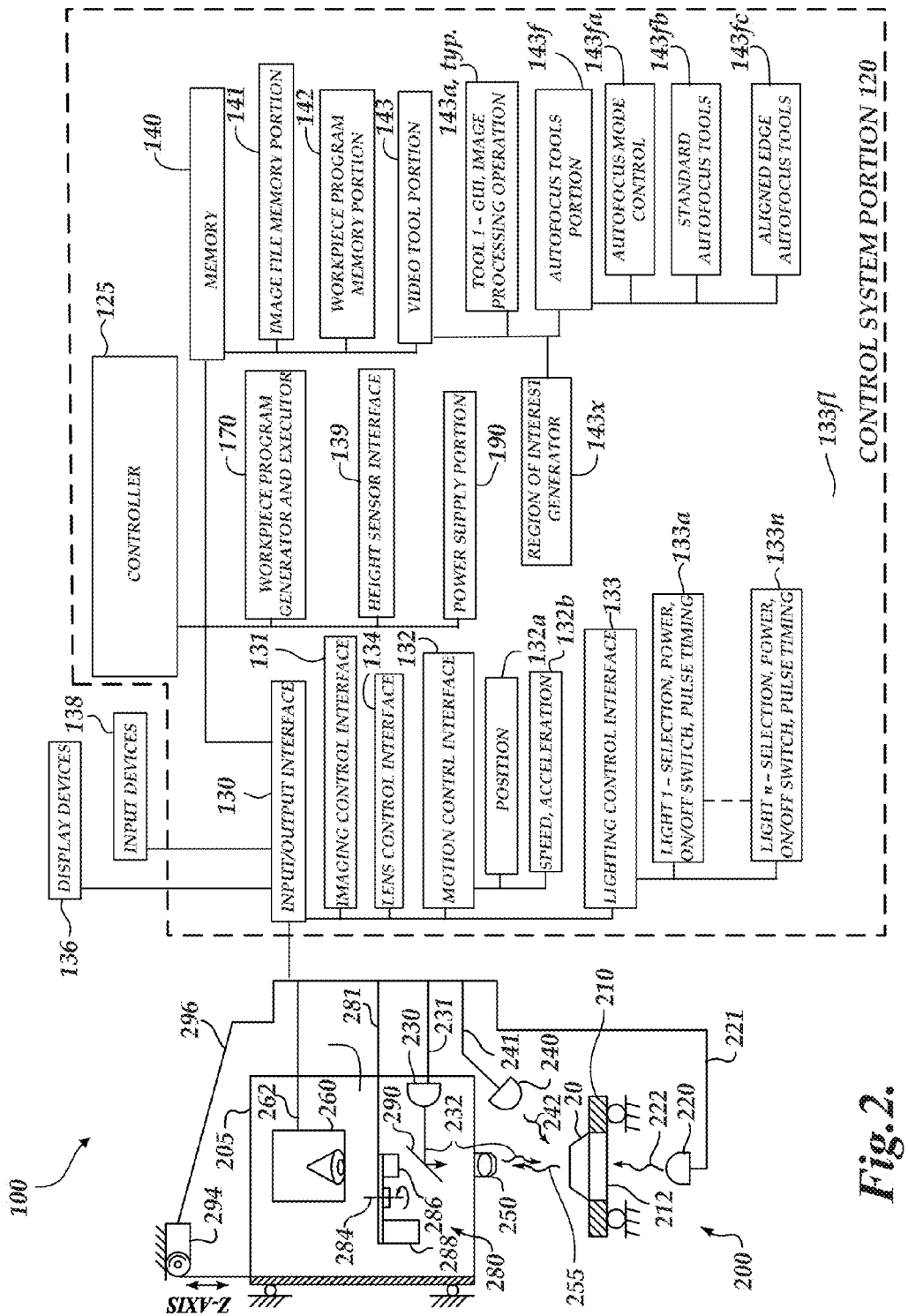
FIG. 2 is a block diagram of a control system portion and a vision components portion of a machine vision inspection system similar to that of FIG. 1, and including features described herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included.

The optical assembly portion 205 is controllably movable along a Z axis that is generally orthogonal to the X and Y axes, by using a controllable motor 294 that drives an actuator to move the optical assembly portion 205 along the Z axis to change the focus of the image of the workpiece 20. The controllable motor 294 is connected to the input/output interface 130 via a signal line 296.

A workpiece 20, or a tray or fixture, holding a plurality of workpieces 20, which is to be imaged using the machine vision inspection system 100, is placed on the workpiece stage 210. The workpiece stage 210 may be controlled to move relative to the optical assembly portion 205, such that the interchangeable objective lens 250 moves between locations on a workpiece 20 and/or among a plurality of workpieces 20. One or more of a stage light 220, a coaxial light 230, and a surface light 240 (e.g., a ring light) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a and a speed/acceleration control element 132b, although such elements may be merged and/or indistinguishable. The lighting control interface 133 includes lighting control elements 133a-133n which control, for example, the selection, power, on/off switch, and strobe pulse timing, if applicable, for the various corresponding light sources of the machine vision inspection system 100.

The memory 140 may include an image file memory portion 141, a workpiece program memory portion 142 that may include one or more part programs, or the like, and a video tool portion 143. The video tool portion 143 includes video tool portion 143a and other video tool portions (e.g., 143f), which determine the GUI, image-processing operation, etc., for each of the corresponding video tools, and a region of interest (ROI) generator 143x that supports automatic, semi-automatic and/or manual operations that define various ROIs that are operable in various video tools included in the video tool portion 143.

In the context of this disclosure, and as known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations which are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool, with the underlying operations being included implicitly.

In particular, in various embodiments according to the present disclosure, the video tool portion 143 includes an autofocus tools portion 143f, which provides various operations and features related to autofocus operations, as described in greater detail below. In one embodiment, the autofocus tools portion 143f may include an autofocus mode control 143fa, standard autofocus tools 143fb, and aligned edge autofocus tools 143fc. Briefly, the standard autofocus tools 143fb may operate similarly to known autofocus tools, for example, performing operations in learn mode and run mode such as acquiring a current image stack at various Z heights, generating all or part of a focus curve, and finding its peak as a best focus position. The aligned edge autofocus tools 143fc operate based on the improved focus height repeatability methods and teachings disclosed herein.

In contrast to the standard autofocus tools 143fb, in one example embodiment, the aligned edge autofocus tools 143fc perform operations that reduce the sensitivity of the focus height determination to the offset of an aligned edge feature relative to image pixels, particularly for those aligned edge features that may happen to be aligned with a column or row direction of the pixels in a camera. In another example embodiment, the aligned edge autofocus tools 143fc perform operations that adjust the offset of the aligned edge feature relative to the image pixels according to a predetermined offset repeatability criteria, such that the image data that is used in the focus height determination fulfills the offset repeatability criteria. The autofocus mode control 143fa may perform operations, as disclosed herein, to configure the autofocus tools (e.g., the standard autofocus tools 143fb or the aligned edge autofocus tools 143fc) or tool modes, depending on which tool or mode is activated. The descriptor "aligned edge" of the autofocus tools 143fc is not intended to be limiting; it is intended to encompass any autofocus tools that utilize the methods described herein to improve the focus height repeatability.

Alternative configurations are possible for the autofocus tools portion 143f. For example, the standard autofocus tools 143fb and the aligned edge autofocus tools 143fc may include partitioned mode control functions such that a separate mode control portion 143fa may be omitted. Alternatively, the autofocus tools portion 143f may provide one or more generic autofocus tool elements, and the mode control portion 143fa may provide operations that govern the user interface and interrelationships of the generic autofocus tool elements in a manner that depends on whether standard autofocus tool behavior or aligned edge autofocus tool behavior is desired. In such a case, the circuits, routines, or applications that provide the operations of the standard autofocus tools 143fb, and/or the aligned edge autofocus tools 143fc, may be merged and/or indistinguishable. In certain implementations, the autofocus mode control 143fa may be utilized to implement an aligned edge autofocus mode (as opposed to a separate tool). More generally, this invention may be implemented in any now known or later-developed form that is operable in conjunction with the machine vision inspection system 100 to provide the features disclosed herein in relation to the aligned edge autofocus operations.

The signal lines or busses 221, 231, and 241 of the stage light 220, the coaxial lights 230 and 230', and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. The display devices 136 may display user interface features associated with the edge location video tool 143e1.

In various exemplary embodiments, when a user utilizes the machine vision inspection system 100 to create a part program for the workpiece 20, the user generates part program instructions by operating the machine vision inspection system 100 in a learn mode to provide a desired image acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and inspection operations to automatically inspect that particular workpiece feature (that is the corresponding feature in the corresponding location) on a run mode workpiece (or workpieces) that matches the representative workpiece used when creating the part program.

Figure 3A:
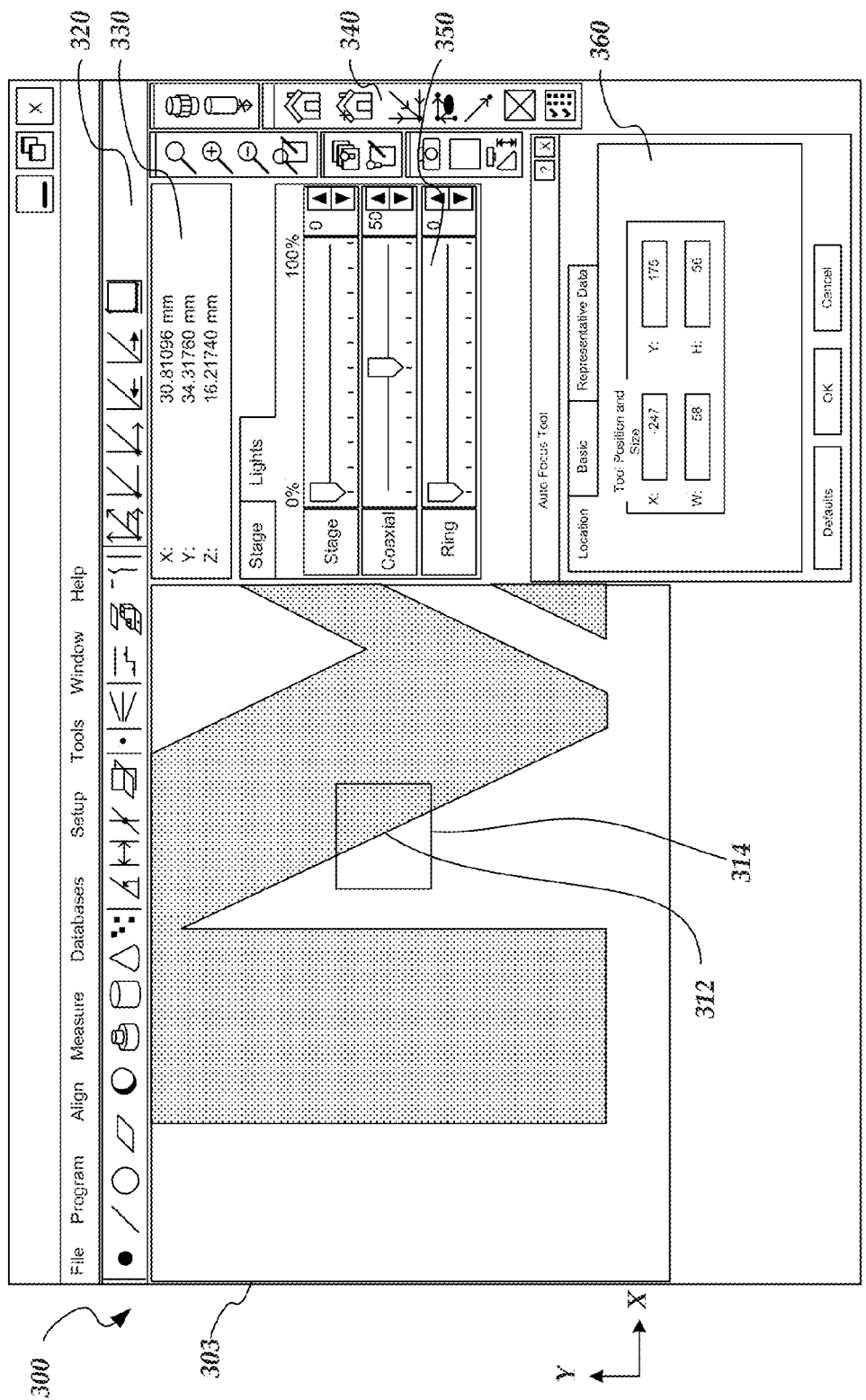
FIGS. 3A and 3B are diagrams illustrating one embodiment of a machine vision inspection system user interface display including an autofocus tool with a region of interest including a non-aligned edge and an associated focus error curve obtained by varying the X position or "X offset" of the non-aligned edge.

FIG. 3A is a diagram illustrating one embodiment of a machine vision inspection system user interface display 300 including an autofocus tool represented by a rectangular indicator for a region of interest 314, which includes a non-aligned edge feature 312. The edge feature 312 is described here as "non-aligned" relative to the column direction Y and row direction X of the image pixels (i.e., in particular as compared to the aligned edge feature 512 of FIG. 5A, as will be described in more detail below). As shown in FIG. 3A, the user interface display 300 includes a field of view window 303 that displays a workpiece image. The user interface 300 also includes various measurement and/or operation selection bars such as the selection bars 320 and 340, a real-time X-Y-Z (position) coordinate window 330, and a light control window 350. The field of view window 303 includes the autofocus tool region of interest 314 superimposed upon a current non-aligned workpiece edge feature 312.

In various embodiments, when the user selects an autofocus tool or mode (e.g., from a selection bar that displays various alternative tool and/or mode selection buttons), the user interface may automatically display an autofocus parameter dialog box 360. In one embodiment, the indicator for the region of interest 314 may be automatically displayed in the user interface to allow a user to graphically define the region of interest for that instance of the autofocus tool (e.g., by dragging handles located on the border of the region of interest 314 using a computer mouse and screen cursor).

Figure 3B:
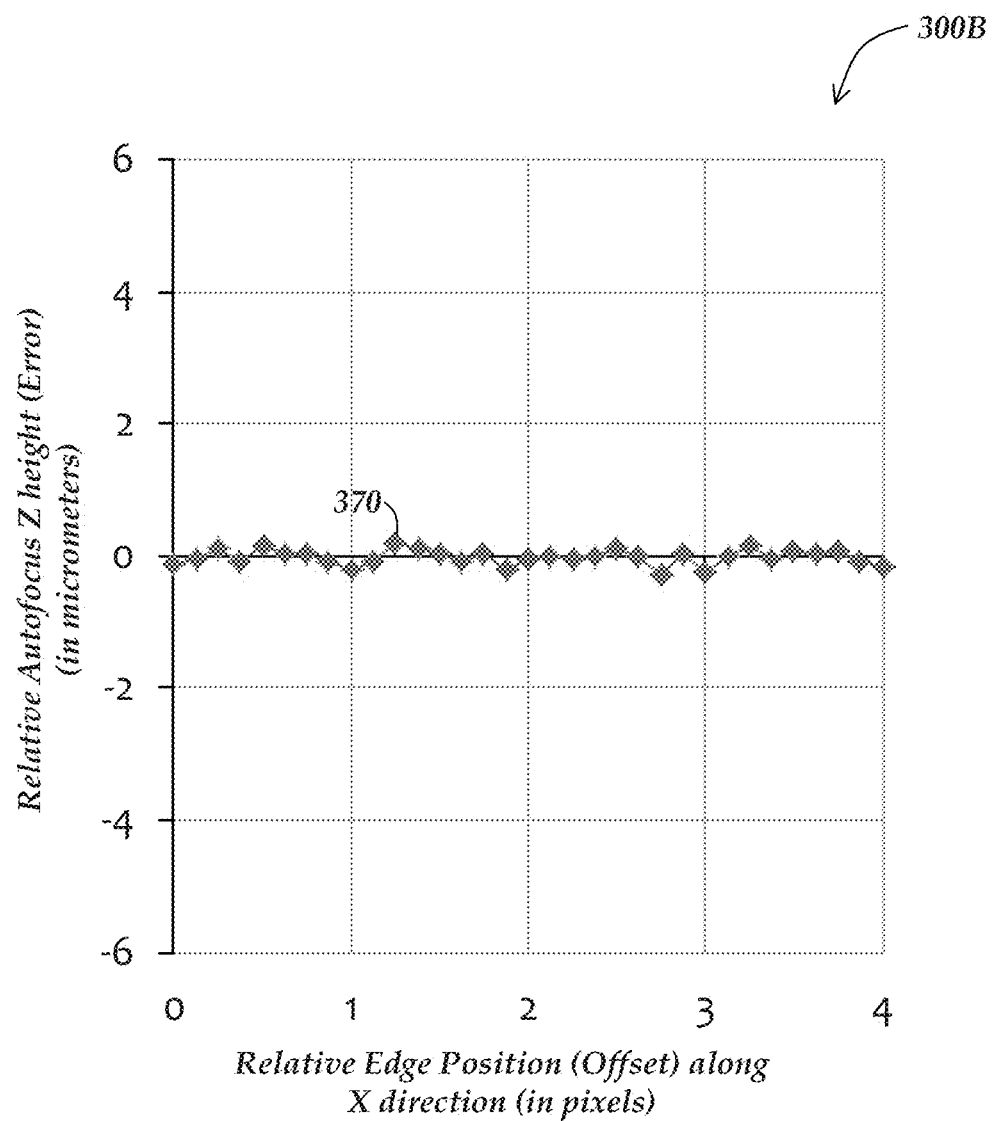

FIG. 3B is a graph 300B of an experimentally determined focus error curve 370 obtained for a typical optical configuration by varying the X position or "X offset" of the non-aligned edge 312 along the X direction relative to the image pixels of the region of interest 314. As shown in FIG. 3B, the focus error curve 370 indicates relatively small variations or errors (e.g., less than half a micrometer) in the best focus position for respective focus determinations corresponding to respective sub-pixel shifts of the non-aligned edge feature 312. In other words, to obtain the focus error curve 370, the non-aligned edge feature 312 is shifted by sub-pixel offset increments along the X axis with respect to the image pixels and region of interest 314 without changing its Z height.

At each offset of the non-aligned edge feature 312, autofocus operations are performed to determine the best focus Z height (e.g., an image stack is acquired, a focus curve is determined, and the peak of the focus curve is estimated to determine the best focus Z height). Relatively minimal focus variations result because due to the "non-alignment" of the edge 312, it actually has a different effective offset relative to each individual row of image pixels.

Since the image pixels of all rows in the region of interest 314 are included in the focus metric calculations that determine each focus curve and corresponding Z-height determination, and each row has a different effective "edge offset," the effects of the individual row offsets tend to average each other out. Thus, no systematic variation in focus is observed as the non-aligned edge feature 312 is shifted by sub-pixel offset increments along the X axis with respect to the image pixels and region of interest 314.

As will be described in more detail below with respect to FIG. 5B, when a similar experiment is performed with respect to an aligned edge feature, significantly greater focus variations may result if traditional autofocus processes are utilized. As will also be described in more detail below, in accordance with principles disclosed herein, various techniques may be utilized to minimize the Z-height sensitivity and/or focus errors for autofocus processes performed on a region of interest including an aligned edge.

Figure 4:
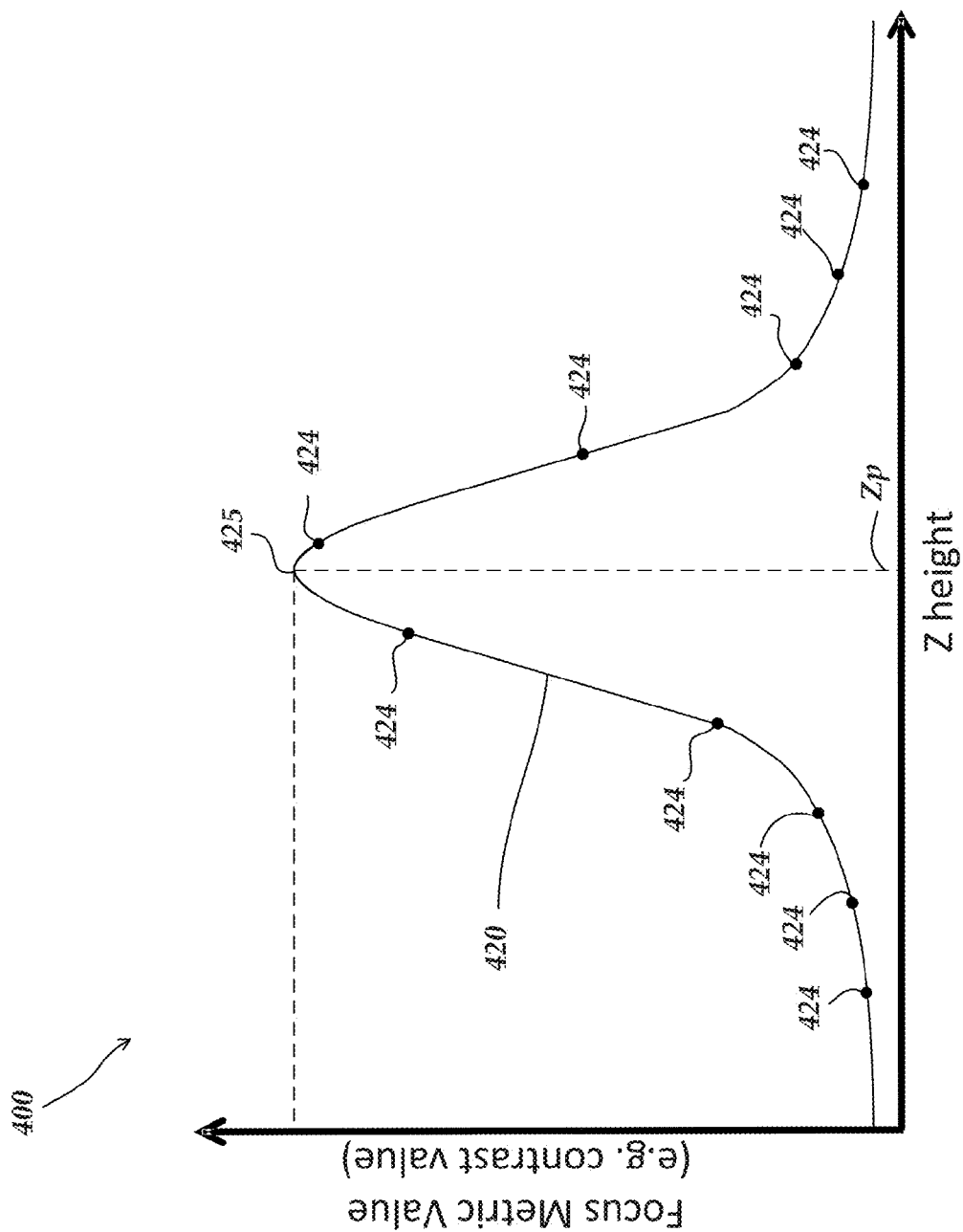
FIG. 4 is a diagram of a typical focus curve.

Prior to further explanation of the principles disclosed herein, included here is a brief review of concepts related to known focus curve determination methods, with reference to FIG. 4. In particular, FIG. 4 is a diagram 400 including a typical focus curve 420 (e.g., as resulting from a region of interest including a textured surface and/or a non-aligned or broad edge, or the like). As shown in FIG. 4, the focus curve 420 is based on the focus curve data points 424, which may be established according to known methods (e.g., as previously outlined and/or as described in incorporated references). Briefly, in one exemplary method, the camera moves through a range of positions or Z heights along a Z axis (the focusing axis) and captures an image at each Z height, creating an "image stack." For each captured image in the image stack, a focus metric value is calculated based on the image (e.g., based on the region of interest in that image), and that focus metric value becomes a data point (e.g., one of the data points 424 in the graph 400) related to the corresponding Z height at which the image was captured. This results in focus curve data, which may be referred to simply as a "focus curve" or "autofocus curve." It will be appreciated that the number of data points 424 shown for the focus curve 420 is exemplary only and is not limiting. The focus curve may be determined from greater or fewer data points, corresponding to more closely spaced or more widely spaced image Z heights, respectively. Exemplary techniques for the determination and analysis of image stacks and focus curves are taught in U.S. Pat. No. 6,542,180, which is commonly assigned and hereby incorporated herein by reference in its entirety.

The peak of the focus curve (e.g., the focus peak 425), which corresponds to the best focus position along the Z axis (and the Z height of the imaged region of interest on the workpiece), may be found by fitting a curve to the focus curve data (at least in the vicinity of the peak) and estimating the Z location of the peak of the fitted curve. Various known focus metrics may be used, as outlined further below. In some example embodiments, a focus metric MF (e.g., as used for the data points 424) may take the form of a summation of local focus or contrast measures LCM (e.g., a contrast measure for pixels surrounding an individual pixel location) over a region of interest, which may be expressed as:

$$MF = \sum_{r=1}^{rmax} \sum_{c=1}^{cmax} LCM_{(r,c)} \quad (Eq. 1)$$

where (r,c) is a pixel location in a region of interest, and rmax is the number of pixel rows in a region of interest and cmax is the number of columns in the region of interest.

Examples of local focus or contrast measures may include:

$$LCMA(r,c) = \frac{1}{9}\sum_{i=r-1}^{r+1}\sum_{j=c-1}^{c+1}(I_{(i,j)} - Iavg_{(r,c)})^2 \quad (Eq. 2)$$

where LCMA(r,c) is a local focus or contrast measure based on a 3×3 pixel set surrounding a central pixel location (r,c), I(i,j) is a pixel intensity at a pixel location (i,j) within the set, and Iavg(r,c) is the average intensity of the set.

$$LCMB(r,c) = (I_{(r,c)} - I_{(r+1,c)})^2 + (I_{(r,c)} - I_{(r,c+1)})^2 \quad (Eq. 3)$$

where LCMB(r,c) is a focus or contrast measure based on a 3-pixel set including a designated pixel location (r,c) and two adjacent pixels, and the various I(-,-) are pixel intensities at adjacent pixel locations within the set.

$$LCMB(r,c) = (I_{(r-1,c)} + I_{(r+1,c)} + I_{(r,c-1)} + I_{(r,c+1)} - 4I_{(r,c)})^2 \quad (Eq. 4)$$

where LCMC(r,c) is a contrast measure based on a 3×3 Laplacian kernel convolved with a 3×3 pixel set including a central pixel location (r,c), and the various I(-,-) are pixel intensities at adjacent pixel locations within the set.

In various embodiments, the focus metric values or curve may be normalized, if desired. In one embodiment, the focus metric values or curve may be normalized by the average grayscale value or average of squared grayscale values of the image pixels in the region of interest. However, it will be understood that the foregoing local focus or contrast measures and focus metrics are exemplary only.

It will be understood from the foregoing discussion that an estimated best focus position or Z height of an imaged surface may generally depend on the underlying local focus or contrast measures, the associated overall focus metric, and the estimated peak of the resulting focus curve for each image in an image stack. When the imaged features in a region of interest are relatively randomly arranged relative to the pixel sets used for the local focus or contrast measures, a resulting overall focus metric which sums a large number of the "random" local focus or contrast measures may be relatively insensitive to the offset of the imaged features. Similarly, a resulting focus curve based on an image stack may also have a stable shape that is relatively insensitive to the offset of the imaged features. Thus, estimating the peak of the focus curve may be a reliable and stable process. Such is the case shown for the "non-aligned" edge shown in FIG. 3A, which is located at a different offset relative to each pixel set used for the local focus or contrast measures that contribute to the focus metric and resulting focus curve. As a result, FIG. 3B shows the resulting Z height (or focus curve peak estimate) is insensitive to offset.

Figure 5A:
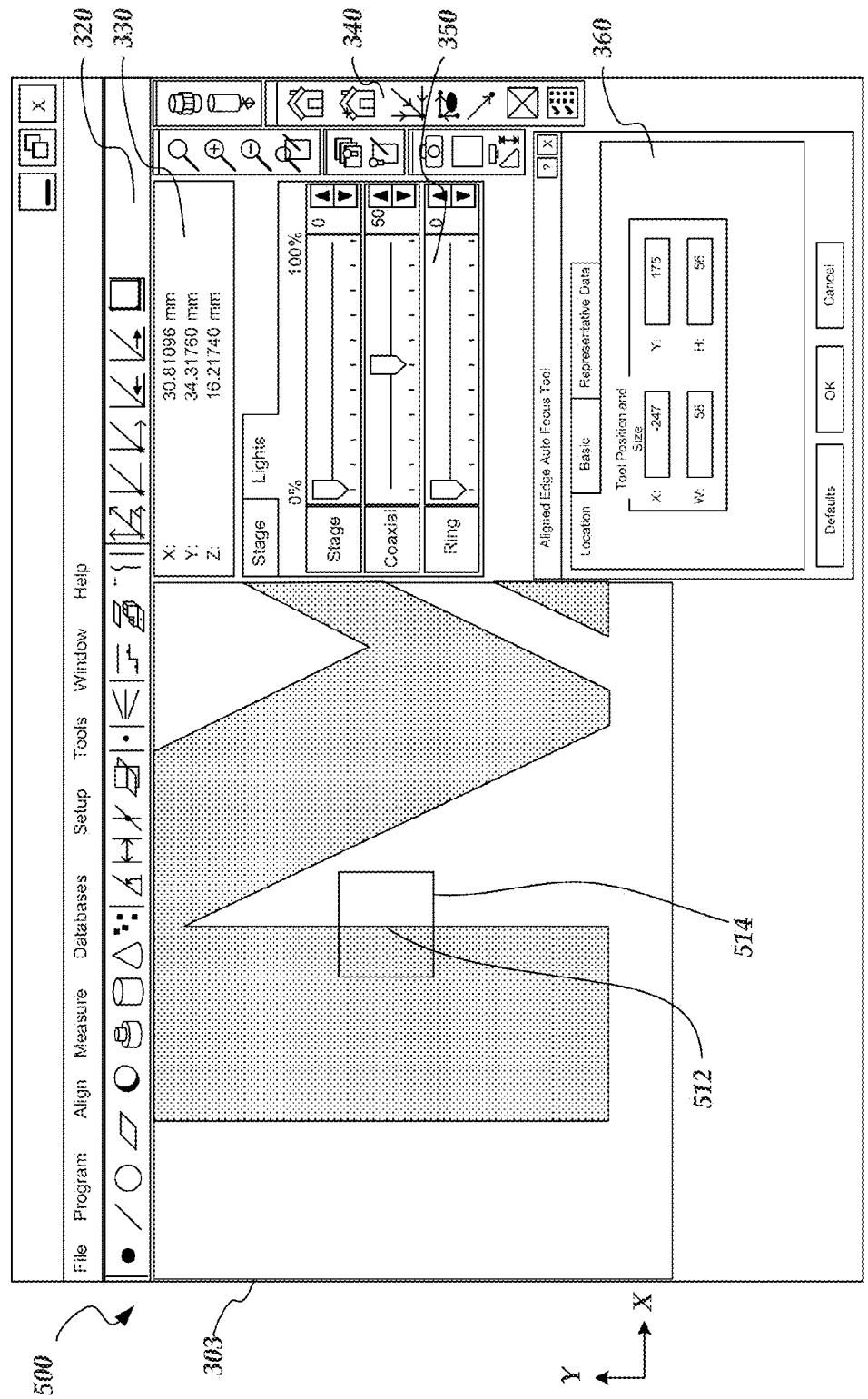
FIGS. 5A and 5B are diagrams illustrating one embodiment of a machine vision inspection system user interface display including an autofocus tool with a region of interest including an aligned edge and an associated focus error curve obtained by varying the X position or "X offset" of the non-aligned edge.

In contrast to the discussion immediately above, FIG. 5A is a diagram illustrating one embodiment of a machine vision inspection system user interface display 500 including an autofocus tool represented by a rectangular indicator for a region of interest 514, which includes an aligned edge feature 512. The edge feature 512 is described herein as "aligned" because it is aligned parallel to the column direction Y of the image pixels, in contrast to the "non-aligned" edge feature 312 of FIG. 3A, as described above. An "aligned" edge feature may alternatively be aligned parallel to the row direction X of the image pixels. An aligned edge feature need not be perfectly straight and/or perfectly parallel to a pixel row or column direction, however. Rather, an aligned edge feature may be considered to be an edge feature which is sufficiently straight and/or sufficiently aligned with a pixel row or column direction such that it introduces a focus height sensitivity that varies depending on the offset of the aligned edge feature relative to the image pixels, as described herein. As a further example, an aligned edge feature may also include an edge feature that is approximately aligned along a direction corresponding to an N times the pixel column pitch divided by M times the pixel row pitch, where N and M are integers (e.g., especially for N and M values of 10 or less).

Various features of the user interface display 500 have been previously described with reference to similarly numbered features in FIG. 3A and need not be described here. The field of view window 303 includes the autofocus tool region of interest 514 superimposed upon a current aligned workpiece edge feature 512. It will be appreciated that the aligned edge feature 512 is not randomly arranged relative to the pixel sets used for local focus or contrast measures in the region of interest. Rather, it is systematically arranged relative to the pixel sets. Therefore, the resulting overall focus metric sums a large number of systematically related local focus or contrast measures, which may be relatively sensitive to the offset of the aligned edge feature 512. A resulting focus curve, based on such focus metrics, may then have a shape that is relatively sensitive to the offset of the aligned edge feature 512, and the estimated peak of such a focus curve may be also be relatively sensitive to the offset of the aligned edge feature 512.

Figure 5B:
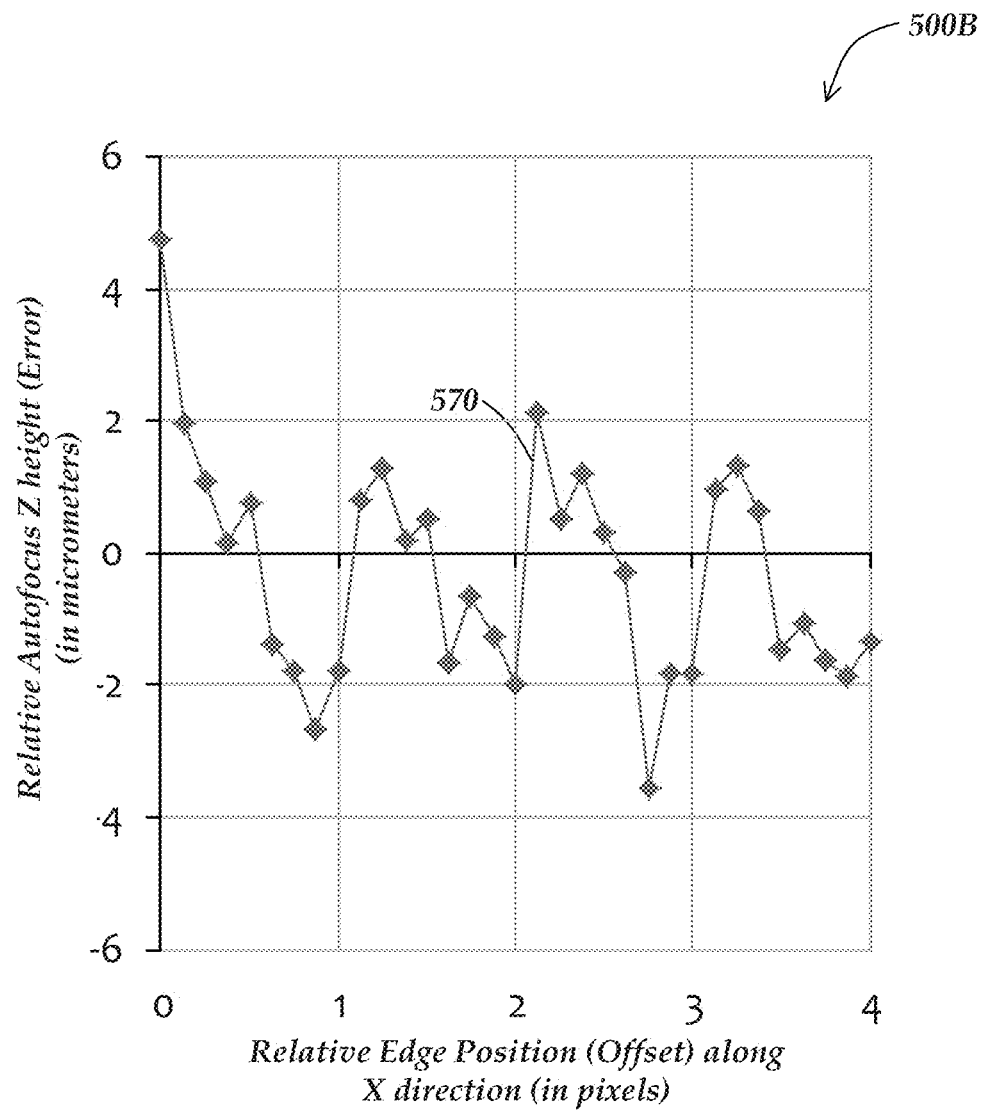

FIG. 5B shows this to be the case. FIG. 5B is a graph 500B of an experimentally determined focus error curve 570 obtained for a typical optical configuration by varying the X position or "X offset" of the aligned edge 512 along the X direction relative to the image pixels of the region of interest 514. As shown in FIG. 5B, the focus error curve 570 indicates significant variations or errors (e.g., =/−2 or 3 micrometers) in the best focus position for respective focus determinations corresponding to respective sub-pixel shifts of the aligned edge feature 512. In other words, to obtain the focus error curve 570, the aligned edge feature 512 is shifted by sub-pixel offset increments along the X axis with respect to the image pixels and region of interest 514 without changing its Z height. At each offset of the aligned edge feature 512, autofocus operations are performed to determine the best focus Z height (e.g., an image stack is acquired, a focus curve is determined, and the peak of the focus curve is estimated to determine the best focus Z height). Significant estimated best focus variations results, and depend on the offset, because each row in the region of interest has approximately the same "edge offset" and they do not "average each other out," in contrast to the results shown in FIG. 3B. Thus, a systematic variation in estimated best focus is observed as the aligned edge feature 512 is shifted by sub-pixel offset increments along the X axis with respect to the image pixels and region of interest 514. It will be noted that the variation is roughly periodic with a period corresponding to the pixel pitch. Related considerations are described below.

Figure 6A:
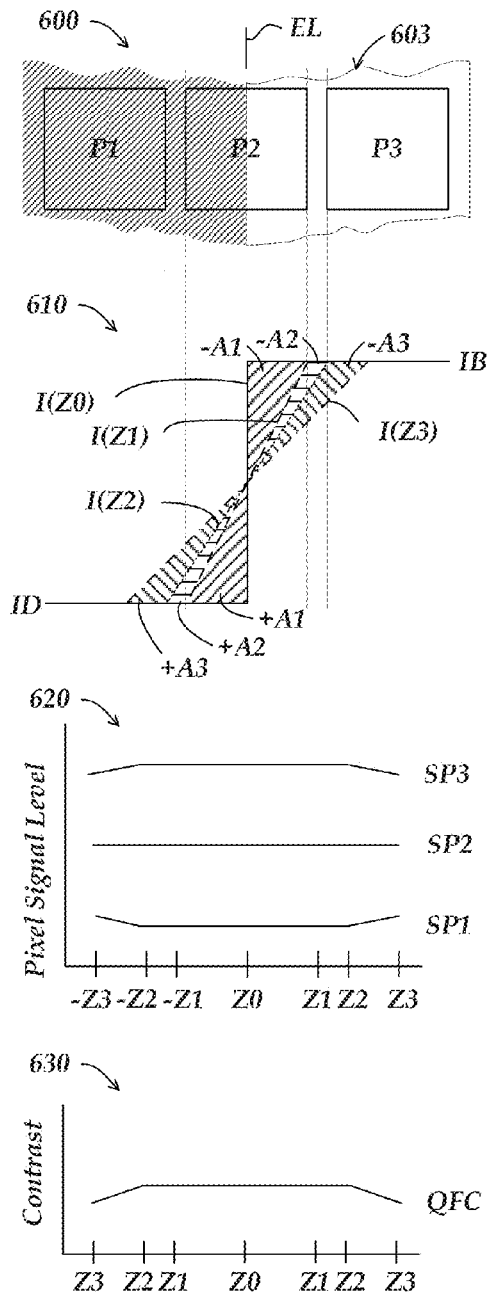
FIGS. 6A and 6B are diagrams qualitatively illustrating how the different positions or offsets of an aligned edge relative to the pixels of a camera may result in different focus curves.
Figure 6B:
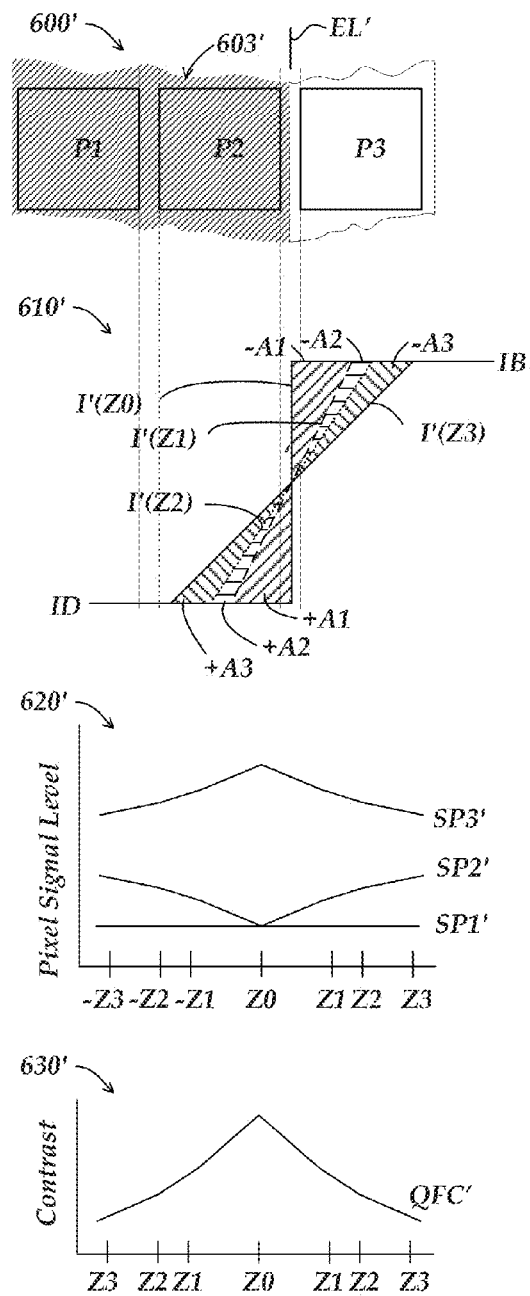

FIGS. 6A and 6B are diagrams qualitatively illustrating how the different positions or offsets of an aligned edge $E^L$, relative to the pixels of a camera, may result in different focus curves.

In particular, FIG. 6A shows a view 600 including three adjacent image pixels P1, P2, and P3 to be used in a local focus or contrast measure. The aligned edge $E^L$ is a sharp vertical edge having a sub-pixel offset that places it in the middle of the pixel P2 in this example. In this example, all image regions to the left of EL (e.g., pixel columns to the left of P1) will be dark or low intensity and exhibit no contrast, and all image regions to the right of EL (e.g., all pixel columns to the right of P3) will be bright or high intensity and exhibit no contrast. Furthermore, it will be appreciated that because EL is an aligned edge, all pixel rows that would be above and below the row including the three adjacent image pixels P1, P2, and P3 would be identical. Thus, it is sufficient to consider pixels P1, P2, and P3 in order to understand the contrast measure effects of offset of the aligned edge EL.

The view 610 in FIG. 6A is a graph qualitatively illustrating how the aligned edge EL affects the received intensity in the pixels P1, P2, and P3 for four different focus levels Z0-Z3. The view 620 in FIG. 6A is a graph qualitatively illustrating how the signal levels in the pixels P1, P2, and P3 respond to the received intensities shown for the four different focus levels Z0-Z3 in the view 610. The focus level Z0 is "perfect focus." As shown by the solid line intensity curve I(Z0) in view 610, the intensity in P1 is ID (D for dark), the intensity rises abruptly from ID to IB (B for bright) in the middle of P2, and the intensity in P3 is IB. Thus, as shown in the view 620, for the best focus level Z0, the signal level SP1 in P1 is ID, the signal level SP3 in P3 is IB, and the signal level in P2 is halfway between ID and IB.

The focus level Z1 is slightly out of focus. As shown by the dashed line intensity curve I(Z1) in view 610 and the associated areas +A1 and −A1, in comparison to Z0, at Z1 the intensity in P1 and P3 is unchanged, and the edge EL blurs in P2 to provide equal and opposite intensity changes in the halves of P2. Thus, as shown in the view 620, the signal levels for the focus level Z1 are the same as for the best focus level Z0. The same results are observed for the focus level Z2, because the blur has extended beyond P2 and into the gap between pixels, but not yet into the adjacent pixels P1 and P3.

Finally, for the focus level Z3, the blur extends into the adjacent pixels P1 and P3. As shown by the dashed line intensity curve I(Z3) in view 610 and the associated areas +A3 and −A3, in comparison to Z0, at Z3 the intensity in P1 begins to increase slightly, and to decrease slightly in P3. The edge EL blurs in P2 to again provide equal and opposite intensity changes in P2. Thus, as shown in the view 620, the signal level SP1 in P1 is slightly increased at focus level Z3, the signal level SP3 in P3 is slightly decreased at focus level Z3, and the signal level in P2 remains halfway between ID and IB at focus level Z3. It will be appreciated that blur effects are approximately the same above and below the best focus height, therefore the signal levels outlined above are shown as symmetric about Z0 in the view 620.

The view 630 in FIG. 6A is a graph illustrating a qualitative focus curve QFC corresponding to the signal levels in the pixels P1, P2, and P3 shown for the four different focus levels Z0-Z3 in the view 620. As previously indicated with reference to the Equations 2-4, local focus or contrast measures and the corresponding resulting focus metrics and focus curves are generally based on and/or are related to intensity differences between adjacent (or at least nearby) pixels. Therefore, the qualitative focus curve QFC is related to the differences between the local pixel signals SP1-SP3, in this simple qualitative example. In particular, the differences between the signals SP1-SP3 are constant for the focus levels +/−Z0, Z1 and Z2, and slightly decreasing at +/−Z3, in this example. Therefore, the qualitative focus curve QFC is constant or flat for the focus levels +/−Z0, Z1 and Z2, and decreasing at +/−Z3. It will be appreciated that the qualitative focus curve QFC has a poorly defined peak location (especially at sub-pixel resolution), since for the offset of the aligned EL shown in FIG. 6A, the pixel signals are not sensitive to some amount of defocus.

FIG. 6B shows a view 600' including the same three adjacent image pixels P1, P2, and P3 as shown in FIG. 6A to be used in a local focus or contrast measure. However, in FIG. 6B, the offset of the aligned edge EL' is different than that shown in FIG. 6A. Otherwise, the following analysis is analogous to that described with reference to FIG. 6A. In FIG. 6B, the aligned edge EL' is a sharp vertical edge having a sub-pixel offset that places it in the middle of the gap between pixels P2 and P3 in this example. In this example, all image regions to the left of EL' (e.g., all pixel columns to the left of P3) will be dark or low intensity and exhibit no contrast, and all image regions to the right of EL' (e.g., all pixel columns to the right of P2) will be bright or high intensity and exhibit no contrast. Furthermore, it will be appreciated that because EL' is an aligned edge, all pixel rows that would be above and below the row, including the three adjacent image pixels P1, P2, and P3, would be identical. Thus, it is sufficient to consider pixels P1, P2, and P3 in order to understand the contrast measure effects of offset of the aligned edge EL'.

The view 610' in FIG. 6B is a graph qualitatively illustrating how the aligned edge EL' affects the received intensity in the pixels P1, P2, and P3 for the four different focus levels Z0-Z3 used in FIG. 6A. The view 620' in FIG. 6B is a graph qualitatively illustrating how the signal levels in the pixels P1, P2, and P3 respond to the received intensities shown for the four different focus levels Z0-Z3 in the view 610'. For the focus level Z0, as shown by the solid line intensity curve I'(Z0) in view 610', the intensity in P1 and P2 is ID. In the gap between P2 and P3, the intensity rises abruptly from ID to IB, and the intensity in P3 is IB. Thus, as shown in the view 620', for the best focus level Z0, the signal levels SP1' in P1 and SP2' in P2 are ID, and the signal level SP3' in P3 is IB. The focus level Z1 is slightly out of focus. As shown by the dashed line intensity curve I'(Z1) in view 610' and the associated areas +A1 and −A1 in comparison to Z0, at Z1, the intensity in P1 is unchanged as is the signal SP1', and the edge EL' blur extends into the adjacent pixels P2 and P3. As shown by the dashed line intensity curve I'(Z1) in view 610' and the associated areas +A1 and −A1, in comparison to Z0, at Z1, the intensity in P2 and the signal SP2' begin to increase slightly, and the intensity in P3 and the signal SP3' begin to decrease slightly.

The focus level Z2 is slightly more out of focus than Z1. As shown by the dashed line intensity curve I'(Z2) in view 610' and the associated areas +A2 and −A2, in comparison to Z1, at Z2, the intensity in P1 is still unchanged as is the signal SP1', and the edge EL' blur extends farther into the adjacent pixels P2 and P3. In comparison to Z1, at Z2, the intensity in P2 further increases, and decreases further in P3.

Continuing along these lines, the focus level Z3 is slightly more out of focus than Z2. As shown by the dashed line intensity curve I'(Z3) in view 610' and the associated areas +A3 and −A3, in comparison to Z2, at Z3, the intensity in P1 is still unchanged, and the edge EL' blur extends farther into the adjacent pixels P2 and P3. In comparison to Z2, at Z3, the intensity in P2 and the signal SP2' further increase, and the intensity in P3 and the signal SP3' further decrease. It will be appreciated that blur effects are approximately the same above and below the best focus height, therefore the signal levels outlined above are shown as symmetric about Z0 in the view 620'.

The view 630' in FIG. 6B is a graph illustrating a qualitative focus curve QFC' corresponding to the signal levels in the pixels P1, P2, and P3 shown for the four different focus levels Z0-Z3 in the view 620'. As previously indicated, local focus or contrast measures and the corresponding resulting focus metrics and focus curves are generally related to intensity differences between adjacent (or at least nearby) pixels. Therefore, the qualitative focus curve QFC' is related to the differences between the local pixel signals SP1'-SP3', in this simple qualitative example. In particular, the difference between the signals SP2' and SP3' is quite large for the focus level Z0. Although the signals SP1' and SP2' are not different at Z0 in this example, if a local focus or contrast measure includes squaring signal differences, then squaring the large difference between the signals SP2' and SP3' will yield a large contribution to the local focus or contrast measure and the focus metric, as shown at Z0 in the view 630'.

At Z1, the difference between the signals SP2' and SP3' is smaller than at Z0. Although the signals SP1' and SP2' are slightly different at Z1 in this example, and contribute to the value of a local focus or contrast measure, the reduced difference between the signals SP2' and SP3' will still cause an overall decrease in the local focus or contrast measure and the focus metric, as shown at Z1 in the view 630'. Continuing along these lines, although the difference between the signals SP1' and SP2' increases at Z2 and Z3 in this example, contributing further to the value of a local focus or contrast measure, the reduced difference between the signals SP2' and SP3' will still cause an overall decrease in the local focus or contrast measure and the focus metric, as shown at Z2 and Z3 in the view 630'.

It will be appreciated that in contrast to the qualitative focus curve QFC the qualitative focus curve QFC' has a well-defined, peak location, since for the offset of the aligned EL' shown in FIG. 6B, the pixel signals are sensitive to very small amounts of defocus.

It will be appreciated that the differences between FIGS. 6A and 6B, and particularly between the qualitative focus curves QFC and QFC', result solely from the difference in the offset of the aligned edge EL and/or EL'. It will be appreciated that the peak of the curve QFC' has a well-defined Z height, while the curve QFC has a "flat" peak that makes it difficult to reliably estimate a particular best focus Z height. Perhaps more importantly, it is clear that different offsets of an aligned edge may change the shape of a focus curve, particularly in the vicinity of its peak. This means that any curve shape that is fit to the resulting focus metric data points may have the wrong shape for various offsets, which will general result in fitting errors and the wrong peak location for various offsets, especially for asymmetric or sparse sets of focus metric data. Such considerations may explain the subtle periodic Z-height estimate errors as a function of offset shown in FIG. 5B.

To address the edge offset sensitivity shown in FIG. 5B and described above, in accordance with principles disclosed herein, various edge offset desensitization operations and/or techniques and related video tool or user interface features may be utilized to minimize the Z-height sensitivity and/or focus errors related to uncontrolled offset of aligned edges in a region of interest, in order to provide more reliable and/or repeatable Z-height measurements for relatively unskilled users of a machine vision inspection system. Briefly, two types of edge offset desensitization operations may be effective. A first type of offset desensitization operations may reduce the sensitivity of the focus height determination to the offset of the aligned edge feature relative to the image pixels. Such operations may be implemented in the signal processing used for Z-height determination when an aligned edge is present in the region of interest. For this first type of desensitization operations, in some embodiments, there may be no differences in the physical operations used to acquire the images used for Z-height determination relative to those used when the region of interest does not include an aligned edge. A second type of offset desensitization operations may physically adjust the offset of the aligned edge feature relative to the image pixels according to a predetermined offset repeatability criteria, such that the image data that is used in the focus height determination fulfills the offset repeatability criteria. Such operations may be implemented in the physical operations used to acquire the images used for Z-height determination when an aligned edge is present in the region of interest. For this second type of desensitization operations, in some embodiments, there may be no differences in the signal processing used for Z-height determination relative to that used when the region of interest does not include an aligned edge.

Figure 7:
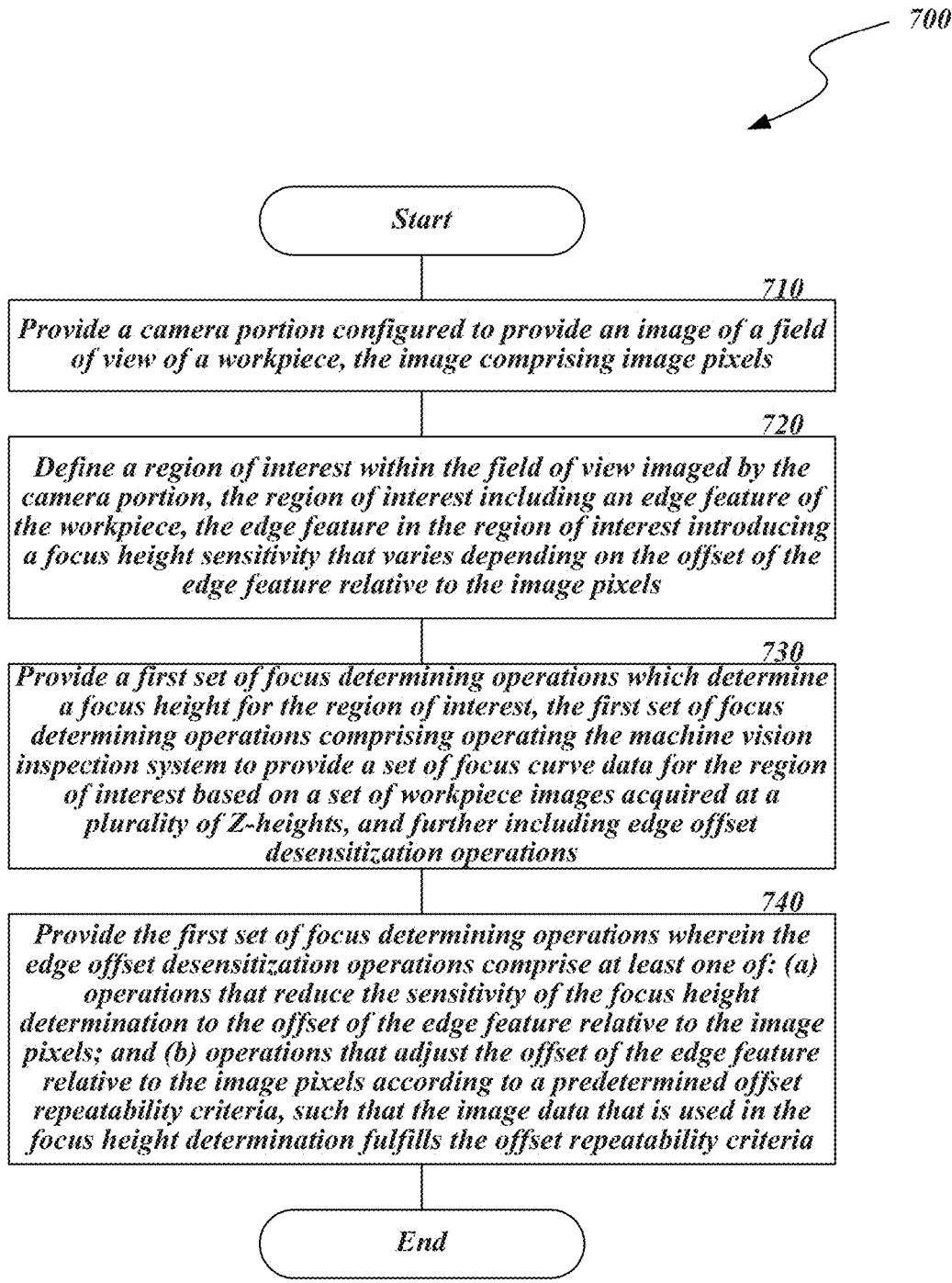
FIG. 7 is a flow diagram illustrating one exemplary embodiment of a general routine for improving focus height repeatability in a machine vision inspection system.

FIG. 7 is a flow diagram illustrating one exemplary embodiment of a routine 700 for improving focus height repeatability in a machine vision inspection system. At block 710, a camera portion is provided that is configured to provide an image of a field of view of a workpiece, wherein the image comprises image pixels. At block 720, a region of interest is defined within the field of view imaged by the camera portion, the region of interest including an aligned edge feature of the workpiece (e.g., by configuring a region of interest indicator such as 314 or 514, described previously), the aligned edge feature in the region of interest introducing a focus height sensitivity that varies depending on the offset of the aligned edge feature relative to the image pixels. As outlined above, such an aligned edge feature may be a sharp edge feature aligned with pixel rows or columns.

At block 730, a first set of focus-determining operations is provided that determines a focus height for the region of interest, the first set of focus-determining operations comprising operating the machine vision inspection system to provide a set of focus curve data for the region of interest based on a set of workpiece images acquired at a plurality of Z heights, and further including edge offset desensitization operations. At block 740, the first set of focus-determining operations is provided wherein the edge offset desensitization operations comprise at least one of: (a) operations that reduce the sensitivity of the focus height determination to the offset of the aligned edge feature relative to the image pixels (e.g., the first type of operations outlined above); and (b) operations that adjust the offset of the aligned edge feature relative to the image pixels according to a predetermined offset repeatability criteria, such that the image data that is used in the focus height determination fulfills the offset repeatability criteria (e.g., the second type of operations outlined above).

It should be appreciated that the operations that reduce the sensitivity of the focus height determination to the offset of the aligned edge feature relative to the image pixels (e.g., the first type of operations outlined above) may comprise various types of techniques. For example, one technique that may be utilized includes using a combination of image data that includes different offsets for determining the best focus height, when an aligned edge is included in the region of interest. The technique tends toward results resembling those of the "non-aligned" edge sensitivity shown in FIG. 3B, because the combined image data may include a plurality of different offsets relative to the pixel sets used for the local focus or contrast measures, which makes the resulting overall focus metric less sensitive to an individual constituent offset (e.g., an offset present when setting up a region of interest based on a single image having a single offset). The resulting Z height (or focus curve peak estimate) is thus less sensitive to offset, because operations are provided that combine multiple offsets when an aligned edge is included in the region of interest.

The foregoing technique may provide relatively accurate and robust focus and/or Z-height results, in that it acquires additional information compared to a conventional focus process (e.g., a second image stack at a second offset). However, this technique is more time-consuming than conventional autofocus and so, in some embodiments, it may be desirable to use it only when an aligned edge is present. In some embodiments, operations of this technique may be provided automatically based on selecting a corresponding mode of a video tool, e.g., based on the manual or automatic determination of an aligned edge in the region of interest. An aligned edge may be automatically identified in the region of interest based on edge detection and line-fitting operations, or Hough transform analysis, or the like.

Another technique that may be used to reduce the sensitivity of the focus height determination to the offset of an aligned edge feature includes low pass filtering of the image data so as to artificially increase the width of the edge feature intensity change region relative to the image pixels (e.g., low pass filtering along a direction transverse to the edge feature). Regarding this technique, it may be seen in FIGS. 6A and 6B, views 630 and 630', that the qualitative focus curves QFC and QFC' are more similar at the less focused or more blurred focus levels Z2 and Z3 than at the sharply focused level Z0. Low pass filtering transverse to the edge feature is similar to blurring. Thus, focus results may be less sensitive to offset when low pass filtering is applied. However, the potential for high resolution and accuracy for Z-height measurement may be somewhat reduced as the focus peak height is reduced. When this technique is used, in some embodiments, the focus metric determining operations may be the same for aligned and non-aligned edges. In one simple embodiment, the low pass filtering may comprise replacing pixel intensities with average intensities of a group of adjacent pixels along a direction transverse to the edge feature. In some embodiments, the filtering may be limited to a region proximate to the edge feature, such that only the systematic high spatial frequency information that is related to the aligned edge feature is removed from the focus determination for the region of interest.

An alternative low pass technique may include adding a low pass filtering component to the focus metric operations, such that the image data itself may in some instances include no alterations. For example, as outlined previously, focus metric values for respective workpiece images may be determined based on a combination of a plurality of local contrast or focus measures, which are based on respective local sub-regions of pixels within the region of interest. The operations that reduce the sensitivity of the focus height determination to the offset may comprise using a local contrast or focus measure that includes a low pass spatial filtering feature.

For example, the local contrast or focus measures may be based on intensity differences within the local sub-regions of pixels and the low pass spatial filtering feature may comprise one or more of: (a) using intensity differences between more widely separated pixels in the local contrast or focus measure when an aligned edge is present; (b) using intensity differences between averages of a larger number of pixel intensity values in the local contrast or focus measure when an aligned edge is present; (c) using a larger local sub-region of pixels in the local contrast or focus measure when an aligned edge is present; or (d) using differences between averages of a larger number of intensity differences in the local contrast or focus measure when an aligned edge is present. Other possible embodiments will be apparent to one skilled in the art based on the principles disclosed herein.

It should be appreciated that the edge offset desensitization operations that adjust the offset of the aligned edge feature relative to the image pixels according to a predetermined offset repeatability criteria (e.g., the second type of operations outlined above) may comprise various types of techniques. For example, various techniques may include physically adjusting the offset according to a criteria based on a contrast or gradient measurement, or the like, when an aligned edge is included in the region of interest. Regarding this technique, it may be seen in FIGS. 6A and 6B that the signal levels SP2 and SP3 (in view 620) are most dissimilar from the signal levels SP2' and SP3' (in view 620') at the sharply focused level Z0. In particular, the difference (SP3-SP2) is most dissimilar from the difference (SP3'-SP2') at the focus level Z0 because the edge offset is located on the border between pixels for the difference (SP3'-SP2'), which makes the signal levels SP3' and SP2' as different as possible for an aligned focused edge. This indicates that for images with sufficient focus, one may adjust the offset to a repeatable location relative to the pixels by evaluating a relationship or metric that reflects the differences between the signal levels in adjacent or nearby pixels along a direction transverse to the edge.

It will be appreciated that various relationships or metrics are responsive to such differences. In one embodiment, the offset may be adjusted according to an offset repeatability criteria wherein the intensity gradient along one or more scan lines in the region of interest is maximized for a particular focus level (e.g., a well-focused level), or alternatively has a predetermined value. In one embodiment, the predetermined value may be expressed as a predetermined percentage of the observed range for the gradient for offsets distributed over the pixel pitch, or the like. In one embodiment, the predetermined value or percentage may be determined based on characterizing the intensity gradient at a desired or current offset during learn mode, and setting the predetermined value or percentage based on that characterization (e.g., such that it approximately matches that characterization). In one embodiment, the predetermined value or percentage may be a minimum limit determined based on experimentation or analysis.

As previously noted, various focus metrics are based on local focus or contrast measures that are responsive to differences between nearby pixels. As shown in FIGS. 6A and 6B qualitative focus curves QFC and QFC' are most dissimilar at the sharply focused level Z0. In particular, the qualitative focus curve QFC' has a higher, narrower peak because the edge offset is located on the border between pixels. Thus, in another embodiment, the offset may be adjusted according to an offset repeatability criteria wherein a focus metric is maximized at a particular focus level (e.g., a well-focused level), or alternatively has a predetermined value. In one embodiment, the predetermined value may be expressed as a predetermined percentage of the observed range for the focus metric for offsets distributed over the pixel pitch, or the like. In one embodiment, the predetermined value or percentage may be determined based on characterizing the focus metric at a desired or current offset during learn mode, and setting the predetermined value or percentage based on that characterization (e.g., such that it approximately matches that characterization). In one embodiment, the predetermined value or percentage may be a minimum limit determined based on experimentation or analysis.

According to the foregoing offset adjustment techniques, the resulting Z height (or focus curve peak estimate) is less sensitive to offset, because operations are provided that make the offset repeatable before a valid measurement is provided. This technique may provide relatively accurate and robust focus and/or Z-height results in that it acquires additional information compared to a conventional focus process (e.g., information is gathered as various offsets, and the offset is adjusted). However, this technique is more time-consuming than conventional autofocus and so, in some embodiments, it may be desirable to use it only when an aligned edge is present. In some embodiments, operations of this technique may be provided automatically based on selecting a corresponding mode of a video tool, e.g., based on the manual or automatic determination of an aligned edge in the region of interest. An aligned edge may be automatically identified in the region of interest based on edge detection and line-fitting operations, or Hough transform analysis, or the like. The orientation of the identified aligned edge may also be determined and used to control the direction along which the offset is adjusted, in some embodiments. It will be appreciated that the foregoing embodiments are illustrative only and are not limiting. Other possible embodiments will be apparent to one skilled in the art based on the principles disclosed herein.

Figure 8:
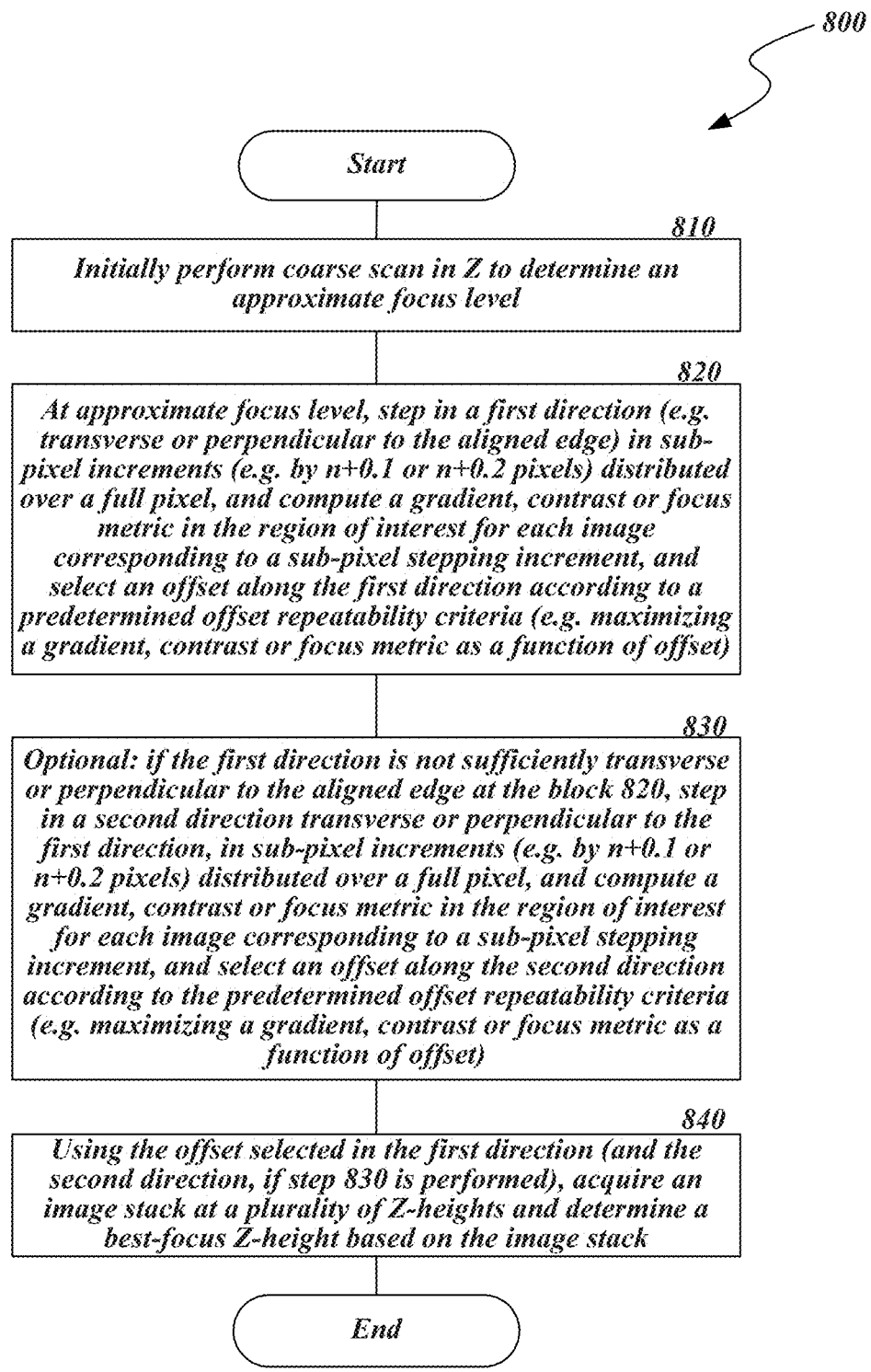
FIG. 8 is a flow diagram illustrating one exemplary embodiment of a specific example routine for adjusting the offset of an aligned edge feature through a series of sub-pixel steps so as to determine a location which improves focus height repeatability.

FIG. 8 is a flow diagram illustrating one exemplary embodiment of a specific example routine 800 for adjusting the offset of an aligned edge feature through a series of sub-pixel steps so as to determine a location which improves focus height repeatability. At block 810, a coarse scan in Z is initially performed so as to determine an approximate focus level. At block 820, at the approximate focus level, the offset is stepped in a first direction (e.g., transverse or perpendicular to the aligned edge) in sub-pixel increments (e.g., by n+0.1 or n+0.2 pixels) until sub-pixel offset increments distributed over a full pixel have been used to acquire images and compute a gradient, contrast, or focus metric in the region of interest for each image corresponding to a sub-pixel stepping increment, and select an offset along the first direction according to a predetermined offset repeatability criteria (e.g., maximizing a gradient, contrast, or focus metric as a function of offset, or the like, as previously outlined.)

At block 830, if the direction transverse or perpendicular to the aligned edge is not known at block 820, then at block 830 a similar process is performed in a second direction (e.g., along a direction perpendicular to the first direction) so as to select an offset along the second direction according to a predetermined offset repeatability criteria. For example, using the offset determined in block 820 along the first direction, the offset is stepped in the second direction (e.g., transverse or perpendicular to the first direction) in sub-pixel increments (e.g., by n+0.1 or n+0.2 pixels) until sub-pixel offset increments distributed over a full pixel have been used to acquire images and compute a gradient, contrast, or focus metric in the region of interest for each image corresponding to a sub-pixel stepping increment, and select an offset along the second direction according to the predetermined offset repeatability criteria (e.g., maximizing a gradient, contrast, or focus metric as a function of offset, or the like, as previously outlined).

At block 840, using the using the offset selected in the first direction (and the second direction, if step 830 is performed), acquire an image stack at a plurality of Z heights and determine a best focus Z height based on the image stack.

It will be appreciated that in accordance with the principles described above, in some implementations, for a vertical aligned edge feature in the field of view, the sub-pixel steps along the X axis primarily determine the optimal offset. Similarly, for a horizontal edge in the field of view, the sub-pixel steps along the Y axis primarily determine the optimal offset. For a non-aligned angled edge that successfully "mixes" or averages the errors, in certain implementations it may not be necessary to utilize certain portions of the above described techniques in order to achieve a desired level of accuracy. For "unlucky" angled edges that remain sensitive (e.g., integral slope in XY in units of pixels of 1:2, 1:3, or 5:1, 6:1, etc.) both the X- and Y-axis searches may help optimize the autofocus results, and thus may benefit from the above described "aligned edge" techniques.

In certain implementations, one issue to be addressed is that it may be difficult in some systems to command a small sub-pixel (e.g., 0.1, 0.2, etc.) offset shift in X or Y. However, moves of greater amounts (e.g., +5.5 pixels) may often still be implemented in such systems, and friction and stiction may make the stage land at the selected number of pixels +/−a relatively small random amount. In such instances, by making a certain number (e.g., 10, 20, etc.) of stage moves of a few pixels, and registering the images based on knowledge of the actual XYZ location at the stage stops, a certain number (e.g., 5, 10, etc.) of images may be assembled that are spaced to sub-pixel resolution (with a variable "integer number" of pixels being largely irrelevant to the present purposes of offset testing). Once the optimal location is determined, the system may be required to perform several jumps to return to the optimal alignment.

In various implementations, the above described techniques may be utilized as part of a "highest accuracy" search in a learn mode. For example, various known systems currently provide a user with a choice of utilizing a fast, medium, or slow method (with the slowest typically being the most accurate). The above described techniques may be utilized in such systems in some instances as part of the "slow" (i.e., highest accuracy) method.

In various implementations, a determination may be made during a learn mode as to whether the above-described techniques produce an improvement. As an example, a quick search may be performed with sub-pixel steps in the X- and Y-axis directions to determine if there is much contrast variance. If the contrast is relatively even across the X and Y search ranges, the learn syntax may determine that the above-described techniques do not need to be utilized. If the contrast does vary across the X and Y search ranges, the learn syntax may determine that the above-described techniques should be utilized so as to improve the autofocus results. In various implementations, the directionality of texture and/or edges may be evaluated and may be utilized to determine if the slope is such that the above described techniques should be utilized.

From the foregoing, it will be appreciated that specific embodiments of the invention have been described herein for purposes of illustration, but that various modifications may be made without deviating from the scope of the invention. For example, those skilled in the art will appreciate that the depicted flow charts may be altered in a variety of ways. More specifically, the order of the steps may be re-arranged, steps may be performed in parallel, steps may be omitted, other steps may be included, etc. Accordingly, the invention is not limited except as by the appended claims.

The embodiments of the invention in which an exclusive property or privilege is claimed are defined as follows:

1. A method for focus height repeatability improvement in a machine vision inspection system to be utilized for performing measurement operations on a workpiece, the method comprising:
   providing a camera portion configured to provide an image of a field of view of the workpiece, the image comprising image pixels;
   providing a focus-determining video tool that includes elements for defining a region of interest within the field of view imaged by the camera portion, wherein the region of interest may include an aligned edge feature of the workpiece in the region of interest that has an alignment such that it introduces a focus height sensitivity that varies depending on an offset of the aligned edge feature relative to the image pixels; and
   providing a first set of focus-determining operations that determines a focus height for the region of interest, the first set of focus-determining operations comprising operating the machine vision inspection system to provide a set of focus curve data for the region of interest based on a set of workpiece images acquired at a plurality of Z heights, and further including edge offset desensitization operations comprising at least one of:
      (a) operations that reduce the sensitivity of the focus height determination to the offset of the aligned edge feature relative to the image pixels; and
      (b) operations that adjust the offset of the aligned edge feature relative to the image pixels according to a predetermined offset repeatability criteria.

2. The method of claim 1, further comprising providing a second set of focus-determining operations that determines a focus height for the region of interest, the second set of focus-determining operations comprising operating the machine vision inspection system to provide a set of focus curve data for the region of interest based on the set of workpiece images acquired at the plurality of Z heights, wherein the second set of focus-determining operations does not include edge offset desensitization operations included in the first set of focus-determining operations.

3. The method of claim 2, further comprising automatically determining whether the first or second set of focus-determining operations will be utilized based on determining whether the aligned edge feature is approximately aligned with one of the row or column direction of the image pixels and is included in the region of interest.

4. The method of claim 2, wherein providing the set of focus curve data comprises determining a respective focus metric values for respective workpiece images, wherein each focus metric value comprises a combination of a plurality of local focus measures based on respective local sub-regions of pixels within the region of interest, and wherein the operations that reduce the sensitivity of the focus height determination to the offset comprise using a first local focus measure that includes a low pass spatial filtering feature that is not included in a second local focus measure that is used in the second set of focus-determining operations.

5. The method of claim 4, wherein the first and second local focus measures are based on intensity differences within the local sub-regions of pixels and the low pass spatial filtering feature comprises one or more of: using intensity differences between more widely separated pixels in the first local focus measure; using intensity differences between averages of a first larger number pixel intensity values in the first local focus measure and a second smaller number of pixel intensity values in the second local focus measure; using a first larger local sub-region of pixels in the first local focus measure and a second smaller local sub-region of pixels in the second local focus measure; or using differences between averages of a first large number of intensity differences in the first local focus measure and differences between averages of a second smaller number of intensity differences in the second local focus measure.

6. The method of claim 2, further comprising providing a focus tool that operates in at least two modes, wherein in a first mode, the first set of focus-determining operations are utilized, and in a second mode, a second set of focus-determining operations are utilized.

7. The method of claim 6, wherein the first or second mode is selected for the focus tool by one of (a) user selection and (b) automatic selection based on focus tool operations that determine whether there is an aligned edge in the region of interest.

8. The method of claim 1, wherein the edge offset desensitization operations comprise the operations that reduce the sensitivity of the focus height determination to the offset, and those operations comprise using a combination of image data that includes different offsets in the image data used for the focus height determination.

9. The method of claim 1, wherein the edge offset desensitization operations comprise the operations that reduce the sensitivity of the focus height determination to the offset and those operations comprise low pass spatial filtering at least the region of interest of the set of workpiece images along a direction transverse to the aligned edge feature, prior to determining the focus curve data.

10. The method of claim 1, wherein the edge offset desensitization operations comprise the operations that adjust the offset of the aligned edge feature relative to the image pixels according to the predetermined offset repeatability criteria.

11. The method of claim 10, wherein the operations that adjust the offset of the aligned edge feature relative to the image pixels according to the predetermined offset repeatability criteria comprise obtaining a plurality of images corresponding to respective sub-pixel offset locations transverse to the aligned edge feature using a same preliminary focus height for the plurality of images, analyzing the plurality of images to determine their respective characteristics in relation to the predetermined offset repeatability criteria, and adjusting the offset based on their respective characteristics such that the offset provides an image that satisfies the predetermined offset repeatability criteria.

12. The method of claim 11, wherein the respective characteristic comprises at least one of an intensity gradient measure, a contrast measure, and a focus metric, in the region of interest, and wherein the offset is adjusted to maximize the at least one of the intensity gradient measure, contrast measure, and focus metric.

13. The method of claim 12, wherein the preliminary focus height is a best focus height determined based on a preliminary image stack, and wherein the offset in the preliminary image stack is a preliminary offset that is not specifically adjusted.

14. A machine vision inspection system for performing measurement operations including a focus height repeatability improvement on a workpiece, the machine vision inspection system comprising:
a camera portion configured to provide an image of a field of view of the workpiece, the image comprising image pixels;
a memory for storing programmed instructions; and
a processor configured to execute the programmed instructions to perform operations including:
providing a focus-determining video tool that includes elements for defining a region of interest within the field of view imaged by the camera portion, wherein the region of interest may include an aligned edge feature of the workpiece in the region of interest that has an alignment such that it introduces a focus height sensitivity that varies depending on an offset of the aligned edge feature relative to the image pixels; and
providing a first set of focus-determining operations that determines a focus height for the region of interest, the first set of focus-determining operations comprising operating the machine vision inspection system to provide a set of focus curve data for the region of interest based on a set of workpiece images acquired at a plurality of Z heights, and further including edge offset desensitization operations comprising at least one of:
(a) operations that reduce the sensitivity of the focus height determination to the offset of the aligned edge feature relative to the image pixels; and
(b) operations that adjust the offset of the aligned edge feature relative to the image pixels according to a predetermined offset repeatability criteria.

15. The machine vision inspection system of claim 14, wherein the operations further comprise providing a second set of focus-determining operations that determines a focus height for the region of interest, the second set of focus-determining operations comprising operating the machine vision inspection system to provide a set of focus curve data for the region of interest based on a set of workpiece images acquired at a plurality of Z heights, wherein the second set of focus-determining operations does not include edge offset desensitization operations included in the first set of focus-determining operations.

16. The machine vision inspection system of claim 15, wherein the edge offset desensitization operations comprise the operations that adjust the offset of the aligned edge feature relative to the image pixels according to the predetermined offset repeatability criteria.

17. A non-transitory computer-readable storage medium with instructions stored thereon that are executable by a processor in a machine vision inspection system to perform measurement operations on a workpiece, comprising:

operating a camera portion configured to provide an image of a field of view of the workpiece, the image comprising image pixels;

providing a focus-determining video tool that includes elements for defining a region of interest within the field of view imaged by the camera portion, wherein the region of interest may include an aligned edge feature of the workpiece in the region of interest that has an alignment such that it introduces a focus height sensitivity that varies depending on an offset of the aligned edge feature relative to the image pixels; and providing a first set of focus-determining operations that determines a focus height for the region of interest, the first set of focus-determining operations comprising operating the machine vision inspection system to provide a set of focus curve data for the region of interest based on a set of workpiece images acquired at a plurality of Z heights, and further including edge offset desensitization operations comprising at least one of:

(a) operations that reduce the sensitivity of the focus height determination to the offset of the aligned edge feature relative to the image pixels; and (b) operations that adjust the offset of the aligned edge feature relative to the image pixels according to a predetermined offset repeatability criteria.

18. The non-transitory computer-readable storage medium of claim 17, wherein the operations further comprise providing a second set of focus-determining operations that determines a focus height for the region of interest, the second set of focus-determining operations comprising operating the machine vision inspection system to provide a set of focus curve data for the region of interest based on a set of workpiece images acquired at a plurality of Z heights, wherein the second set of focus-determining operations does not include edge offset desensitization operations included in the first set of focus-determining operations.

19. The non-transitory computer-readable storage medium of claim 18, wherein the edge offset desensitization operations comprise the operations that adjust the offset of the aligned edge feature relative to the image pixels according to the predetermined offset repeatability criteria.

20. The non-transitory computer-readable storage medium of claim 19, wherein the operations further comprise automatically determining whether the first or second set of focus-determining operations will be utilized based on determining whether the aligned edge feature is approximately aligned with one of the row or column direction of the image pixels and is included in the region of interest.

* * * * *